May 17, 1966  J. S. STOLTZFUS  3,251,632
SUPPORT MEANS FOR LOOSE MATERIAL DISTRIBUTORS
Filed Feb. 10, 1965  3 Sheets-Sheet 1
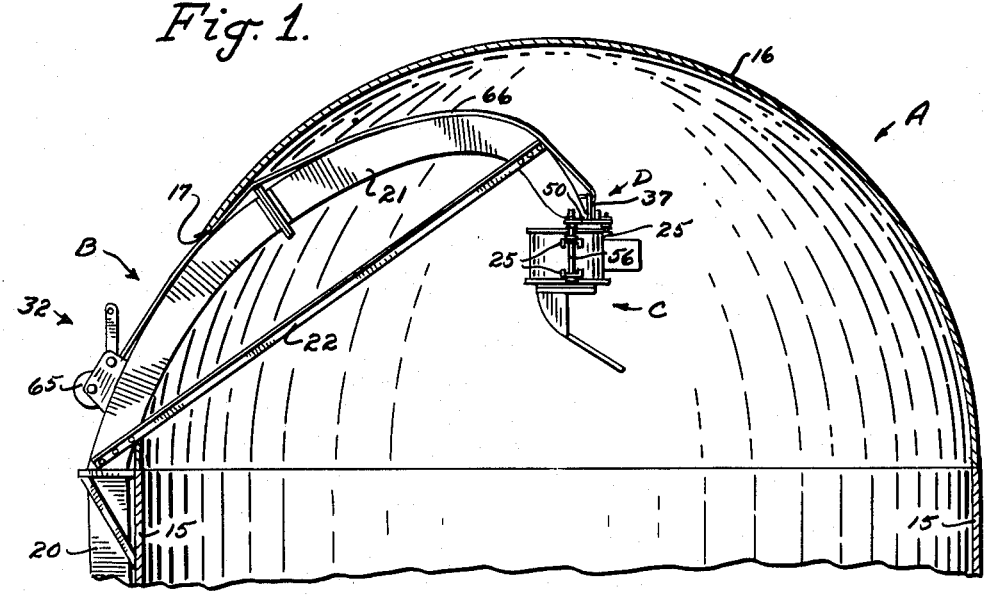
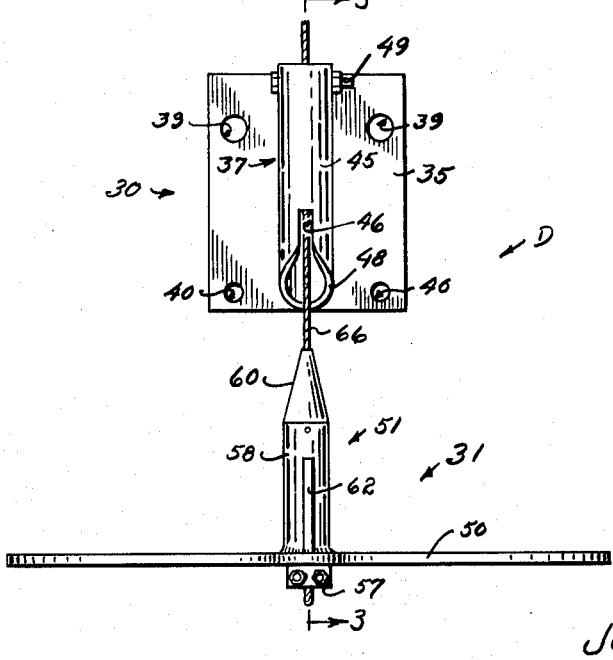
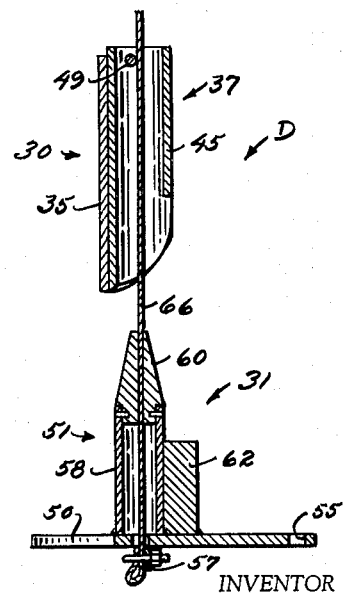
INVENTOR
JOHN S. STOLTZFUS
BY *Rommel, Aluxin and Rommel*
ATTORNEYS

INVENTOR
JOHN S. STOLTZFUS

BY
ATTORNEYS

May 17, 1966 J. S. STOLTZFUS 3,251,632
SUPPORT MEANS FOR LOOSE MATERIAL DISTRIBUTORS
Filed Feb. 10, 1965 3 Sheets-Sheet 3

INVENTOR
JOHN S. STOLTZFUS
BY Rommel, Alluxin & Rommel
ATTORNEYS

United States Patent Office 3,251,632
Patented May 17, 1966

3,251,632
SUPPORT MEANS FOR LOOSE MATERIAL DISTRIBUTORS
John S. Stoltzfus, 53 Strasburg Pike, Lancaster, Pa.
Filed Feb. 10, 1965, Ser. No. 431,619
9 Claims. (Cl. 302—60)

This invention relates generally to support means for loose material distributors and more particularly to silage distributor support means for positioning a silage distributor at the discharge end of a silo filler pipe in juxtaposition for regulated dispensing of silage within a silo.

Inasmuch as the invention was originally conceived for used in connection with silage distributors, the same is illustrated and described in terms of usage with silage distributors. It is, however, to be understood that the invention is not limited to uses with silage distributors, but may be used in connection with other types of loose material distributors.

In the filling of silos, it has long been a problem to provide for proper distribution of the silage within the silo. This has largely been overcome by use of silage distributors such as that disclosed in the patent application of Henry S. Stoltzfus, Serial No. 261,711, filed February 28, 1963. Such distributors are positioned adjacent the discharge end of the silo filler pipe at the uppermost portion of the silo, the same usually being attached to the silo filler pipe when the silo is being filled and removed therefrom after the filling operation has been completed. Various procedures and apparatus have been proposed for such attachment of the distributors, such as those illustrated in U.S. Patents Nos. 1,154,658, dated September 28, 1915; 1,284,081, dated November 5, 1918; and 1,400,753, dated December 20, 1921. Such prior devices have, however, all proven unsatisfactory, for one reason or another.

It is the primary object of this invention to provide silage distributor support means which facilitate attachment and removal of silage distributors adjacent the discharge end of a silo filler pipe.

A further object is the provision of silage distributor support means having improved guide means which assures proper alignment of the distributor with the discharge end of the silo filler pipe.

A further object and provision of silage distributor support means in which the distributor thereof, although readily movable in applying and removing the silage distributor from adjacent the discharge end of the silo filler pipe, is securely held in a predetermined, non-rotative attitude when situated in distributing position adjacent the discharge end of the silo filler pipe.

Other objects and advantages of the invention will be apparent during the course of the following detailed description, taken in connection with the acompanying drawings, forming a portion of this specification, and in which drawings:

FIG. 1 is a vertical sectional view taken through a silo and showing a silage distributor positioned adjacent the discharge end of the silo filler pipe by my improved support means.

FIG. 2 is a front view of my improved support means in the position which it will assume as the distributor is being raised or lowered from its silage dispensing position.

FIG 3 is a transverse sectional view taken substantially on the line 3—3 of FIG. 2.

Figure 10:
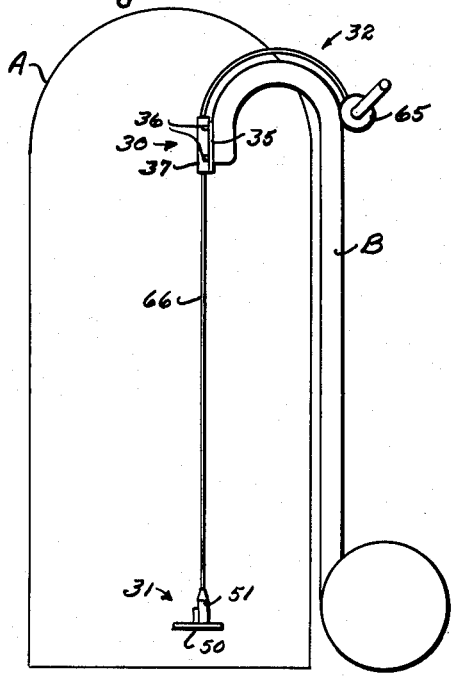
Figure 11:
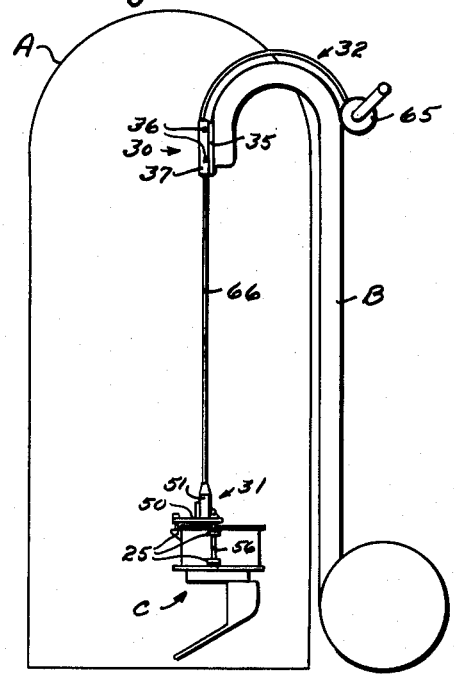
Figure 12:
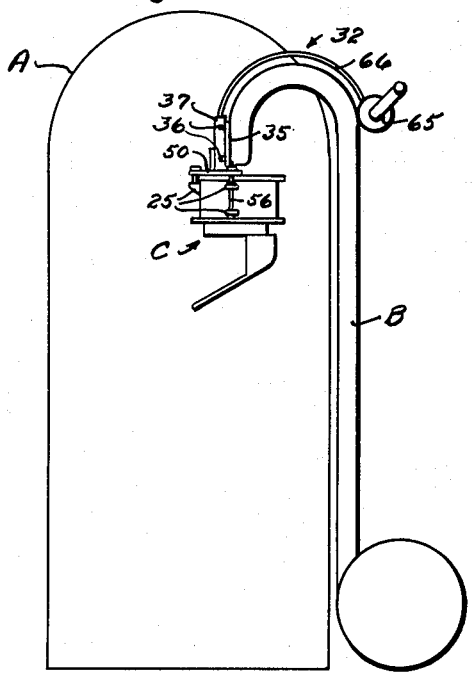

FIGS. 10, 11, and 12 are diagrammatical views showing the various steps and usage of my support means in raising a silage distributor to proper dispensing position adjacent the discharge end of the silo filler pipe.

In the drawings, wherein for the purpose of illustration is shown a preferred embodiment of the invention, and wherein similar reference characters designate corresponding parts throughout the several views, the letter A may generally designate a silo; B a silo filler pipe; C a silage distributor, and D my improved support means.

The silo A may be of any conventional construction, usually having cylindrical side walls 15 and a cover portion 16, openings 17 being provided for ready access to within the upper portion of the silo.

Silo filler pipe B may likewise be of any conventional construction, usually including a vertically extending portion 20, a discharge gooseneck portion 21, extending to within the silo, suitable braces 22 being provided for bracing of the discharge end of the gooseneck at a substantially central position within the upper portion of the silo.

Silage distributor C may likewise be of any conventional type. It may, for instance, be of the type shown in the forementioned pending patent application of Henry S. Stoltzfus, Serial No. 261,711, filed February 28, 1963. In adapting such conventional silage distributors for use with my improved support means, it is only necessary to add appropriately positioned attaching brackets 25, for cooperation with bolts or other connectors for attachment of the same to the support means, as will be subsequently described.

Support means D preferably includes bracket means 30, hanger means 31, and means 32 for moving hanger means 31 with respect to bracket means 30.

Bracket means 30 preferably includes bracket mounting plate 35, fastener means 36 for attachment of bracket means 30 adjacent the discharge end of gooseneck 21, and guide means 37, which is welded or otherwise fixedly secured to bracket mounting plate 35.

Figure 9:
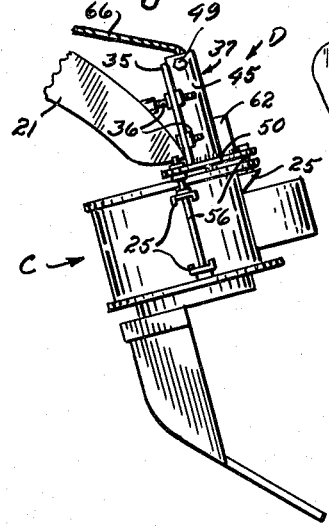
FIG. 9 is a fragmentary view showing the manner in which my improved support means may be positioned for supporting the distributor in an angular relationship with respect to the discharge end of the silo filler pipe, rather than a vertical position, as shown in FIG. 1.

Fastener means 36 preferably comprises a bolt means of sufficient extension so that bracket means 30 may be either vertically disposed, for vertical positioning of the silage distributor adjacent the discharge end of gooseneck 21, as shown in FIG. 1, or may be positioned in various angular positions with respect to gooseneck 21, as shown in FIG. 9. In order to secure proper dispensing of silage within a silo of ten to twelve foot diameter, the distributor is usually mounted in a vertical position, as is shown in FIG. 1; may be tilted to an angle of 15 degrees in a silo of fourteen foot diameter, as shown in FIG. 9; or may be tilted to an angle of 20 degrees or more for silos having diameter of sixteen feet or larger. In this connection, it is to be noted that upper openings 30 of bracket mounting plate 35 are of a larger diameter than lower openings 40. Thus, in the event that fastener means 36 includes a bolt shank fixed in a horizontal position, angular adjustment of the bracket means is enabled by major angular movement of the bolt shank within openings 39 and minor angular movement of the bolt shank within openings 40.

Guide means 37 preferably comprises the female part of a male and female socket arrangement. Guide means 37 preferably includes an elongated cylindrical sleeve 45, open at each end, and provided with a slot 46 at the end thereof which mates with the male part of the male and female socket arrangement. The end of cylindrical sleeve 45, adjacent slot 46, is angularly cut and tapered, as at 48, to provide an end wall surface for guiding a lug of hanger means 31 into slot 46, as will be subsequently described. A guiding cross piece 49 is provided adjacent the uppermost end of cylindrical sleeve 45, for cooperation with means 32, as will be subsequently described.

Hanger means 31 preferably includes distributor mounting plate 50 and guide means 51.

Figure 8:
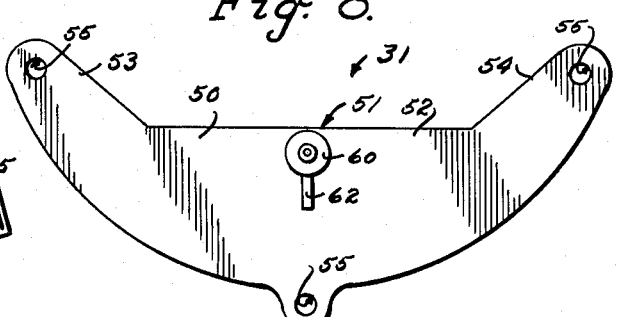
FIG. 8 is a top plan view of the hanger means of my improved support means.

Distributor mounting plate 50 is preferably somewhat of quarter-moon configuration, as shown in FIG. 8, including a main portion 52 and arms 53 and 54, one arm extending to each side of main body portion 52. This shaping of distributor mounting plate 50 is desirable in order that the same will not interfere with the flow of silage from gooseneck 21 to distributor C. Distributor mounting plate 50 is provided with suitably spaced openings 55 for receiving a bolt or other suitable fastening means 56 for attachment of the same to distributor C, such as by attachment of fastener means 56 to brackets 25 of distributor C.

Attached to distributor mounting plate 50, at the same side thereof as distributor C, is a clamp 57, for a purpose which will be subsequently described.

Guide means 51 extends upwardly from distributor mounting plate 50, opposite the side thereof to which is attached distributor C. Guide means 51 preferably comprises the male part of a male and female socket arrangement, guide means 37 comprising the female part thereof. Guide means 51 preferably includes an elongated cylindrically shaped member 58 of a diameter to slidably interfit within cylindrical sleeve 45 of guide means 37. The end of cylindrically shaped member 58, opposite the end thereof attached to distributor mounting plate 50, is preferably provided with a cone-shaped nose portion 60. An elongated lug 62 is provided extending peripherally outwardly from one side of cylindrically shaped member 58, such lug being shaped to slidably interfit within slot 46 of guide means 37.

Means 32 preferably includes a winch 65 and cable 66. Winch 65 may be mounted on the silo in any suitable position. Inasmuch as a ladder (not shown) usually runs exteriorly of the silo, adjacent the silo filler pipe, winch 65 may be conveniently attached to the silo filler pipe adjacent such ladder. Suitable guides or pulleys (not shown) may be provided on gooseneck 21 for guiding cable 66 therealong, to bracket means 30. Cable 66 preferably passes through cylindrical sleeve 45 of bracket means 30, passing over guide cross bar 49, through nose cone 60, through cylindrically shaped member 58, and the end thereof is fixedly secured in clamp 57.

As shown in FIG. 10, with bracket means 30 mounted on silo filler pipe B, cable 66 is fed out from winch 65, and hanger means 31 is lowered to a position adjacent the bottom of the silo. A distributor C may thus be easily attached to hanger mounting plate 50, when hanger means 31 is in the lower position, as shown in FIG. 11. Cable 66 is then raised, by operation of winch 65, and hanger means 31 and distributor C, which is attached thereto, are raised into dispensing position with respect to silo filler pipe B, as shown in FIG. 12.

When hanger means 31 is raised to bracket means 30, cylindrically shaped member 58 of guide means 51 interfits within and mates with cylindrical sleeve 45 of guide means 37. When they are in a fully mated position, guide, means 51 is in axial alignment with guide means 37, lug 62 interfitting within slot 46, so that hanger means 31 and distributor C attached thereto are held in non-rotative alignment in a predetermined position with respect to the discharge end of silo filler pipe B.

Figure 4:
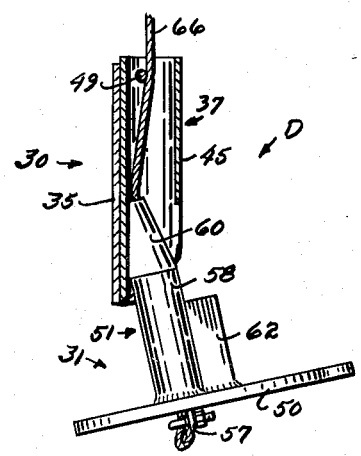
FIG. 4 is a sectional view similar to FIG. 3, showing the manner in which my improved support means corrects for angular misalignment as the distributor is being raised to dispensing position.

As hanger means 31 is being raised, it may become angularly misaligned with respect to bracket means 30. In this case, nose cone 60 will abut against the interior of cylindrical sleeve 45, as is shown in FIG. 4, and serve to guide member 58 into coextensive axial alignment with cylindrical sleeve 45.

Figure 5:
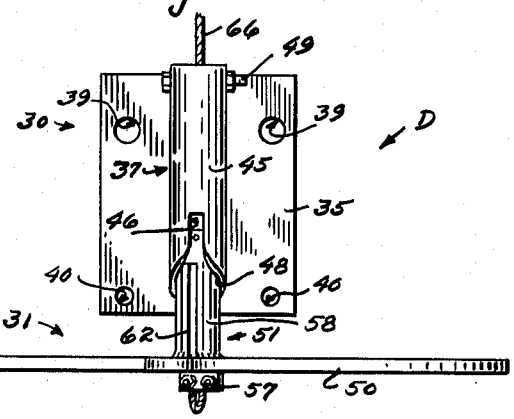
FIG. 5 is a front elevation showing the manner in which my improved support corrects for rotative misalignment as the distributor is being raised to dispensing position.

As not infrequently occurs, there will likely be some turning or twisting of hanger means 31 as it is raised. It is thus necessary to provide some means for rotational adjustment of hanger means 31, and distributor C attached thereto, in order to properly position the distributor in the proper relationship with respect to the discharge end of silo filler pipe B. When such unwanted turning or twisting occurs, and as guide means 31 is drawn into guide means 37, lug 62 will abut against end 48 of cylindrical sleeve 45, being rotated and guided thereby into slot 46, as shown in FIG. 5.

Figure 6:
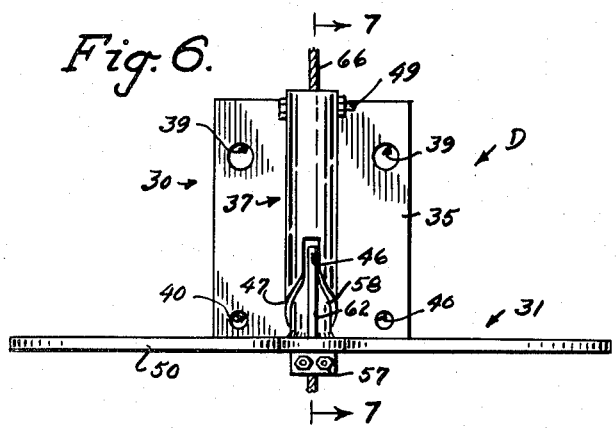
FIG. 6 is a front elevation showing my support means in the position which it assumes when the distributor is positioned for dispensing from the discharge end of the silo filler pipe.
Figure 7:
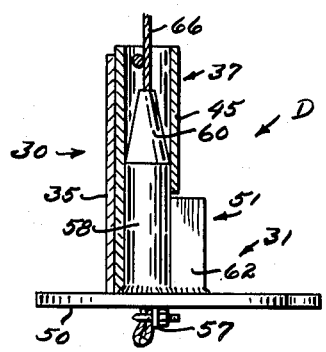
FIG. 7 is a transverse sectional view taken substantially on the line 7—7 of FIG. 6.

When the male and female parts of the respective guide means are fully mated, as is shown in FIGS. 6 and 7, hanger means 31 is held in non-rotative alignment with bracket means 30.

It is obvious that a female part, such as guide means 37, could be provided upon hanger means 31, and that a male part, such as guide means 51, could be mounted on bracket mounting plate 35 in place of guide means 37. The present invention is therefore intended to cover both the male and female socket arrangement shown and the obvious reverse thereof.

Various changes in the shape, size and arrangement of parts may be made to the form of the invention herein shown and described without departing from the spirit of the invention or the scope of the following claims.

I claim:

1. In a support means for positioning a distributor at the discharge end of a loose material conveying conduit in juxtaposition for regulated dispensing of loose material therefrom, the combination of bracket means, said bracket means including guide means; hanger means; said hanger means including guide means; one of said guide means comprising an elongated male part and the other of said guide means comprising an elongated female part, said male and female parts being shaped and positioned for cooperative interconnected mating with each other in non-rotative axial coextensive alignment; means for attaching said bracket means in a predetermined position with respect to the loose material conduit and means for attaching said hanger means to the loose material depositor in juxtaposition so that when said male and female parts are in a mated relationship the loose material depositor will be positioned at the discharge end of the loose material conveying conduit for regulated dispensing of loose material discharged therefrom; and means for moving said male and female parts into and out of a mating relationship.

2. The combination as specified in claim 1 wherein said bracket means includes mounting plate means, said guide means thereof being attached to said mounting plate means, and fastener means for attaching said mounting plate means to the loose material conveying conduit.

3. The combination as specified in claim 2 wherein said fastener means includes means for variable angular positioning of said bracket means with respect to the loose material conveying conduit.

4. The combination as specified in claim 1 wherein said hanger means includes mounting plate means, said guide means thereof being attached to said mounting plate means, and the distributor being attached to said mounting plate means, said mounting plate means comprising a substantially quarter-moon shaped plate having a main portion and an arm portion extending to each side of said main portion in juxtaposed relationship to avoid interference with the flow of loose material from the loose material conveying conduit to the distributor.

5. The combination as specified in claim 1 wherein said guide means comprising an elongated female part includes an elongated cylindrical sleeve having a longitudinally extending slot in the end thereof which first mates with said male part and said male part includes an elongated cylindrically shaped member of a diameter to slidably interfit within said cylindrical sleeve and an elongated lug extending outwardly from the periphery thereof, said lug being shaped and positioned to slidably interfit within said slot of said female part.

6. The combination as specified in claim 5 wherein the end of said cylindrical sleeve having said slot therein is angularly cut and tapered in a manner to provide an end wall surface positioned for abutment with said lug and guiding said lug into said slot.

7. The combination as specified in claim 5 wherein said elongated cylindrically shaped member of said male part is provided with a substantially cone-shaped nose portion at the end thereof which first mates with said female part in a relationship to abut against said cylindrical sleeve of said female part in correcting angular axial misalignment of said male and female parts.

8. The combination as specified in claim 1 wherein said means for moving said male and female parts into and out of a mated relationship comprises winch means and cable means, said cable means leading from said winch means, through said female part of said bracket means, through said male part of said hanger means, and is fixedly attached at one end thereof to said hanger means, in a juxtaposed relationship for vertically raising and lowering said hanger means with respect to said bracket means.

9. In silage distributor support means for positioning a silage distributor at the discharge end of a silo filler pipe in juxtaposition for regulated dispensing of silage within a silo, the combination of bracket means, said bracket means including mounting plate means, guide means attached to said mounting plate means, said guide means comprising an elongated female part including an elongated cylindrical sleeve having a longitudinally extending slot in one end thereof, the end thereof having said slot being angularly cut and tapered in a manner to provide an end wall surface in which a member abutting thereagainst will be guided into said slot, and fastener means for attaching said mounting plate means to the silo filler pipe; hanger means, said hanger means including mounting plate means, guide means attached to said mounting plate means of said hanger means, said guide means of said hanger means comprising a male part including an elongated cylindrical member of a diameter to slidably interfit within said cylindrical sleeve, a cone-shaped nose portion attached to one end of said elongated cylindrically shaped member, elongated lug means mounted on the periphery of said elongated cylindrically shaped member and extending peripherally outwardly thereof, and means for attaching the distributor to said mounting plate means of said hanger means; said respective male and female parts being shaped and positioned on their respective mounting plate means for cooperative interconnected mating of said elongated cylindrical member and said lug means thereof with said elongated cylindrical sleeve and said slot thereof in non-rotative axial coextensive alignment, said male and female parts being juxtaposed with respect to each other so that said male and female parts first mate with each other at the ends thereof having respectively said cone-shaped nose portion and said slot; said bracket means being attached to the silo filler pipe and said hanger means being attached to the distributor in juxtaposition so that when said male and female parts are in a mated relationship the silage depositor will be positioned at the discharge end of the silo filler pipe for regulated dispensing of silage discharged therefrom; and means for moving said male and female parts into and out of a mating relationship, said last mentioned means comprising winch means and cable means, said cable means leading from said winch means, through said cylindrical sleeve, through said elongated cylindrically shaped member and said cone-shaped nose portion thereof, and is fixedly attached at one end thereof to said hanger means, in juxtaposed relationship for vertically raising and lowering said hanger means with respect to said bracket means.

References Cited by the Examiner
UNITED STATES PATENTS

| 1,400,753 | 12/1921 | Loeck | 302—60 |
| 3,175,668 | 3/1965 | Stoltzfus | 302—60 |
| 3,206,044 | 9/1965 | Schwichtenberg | 302—60 |

EVON C. BLUNK, *Primary Examiner.*

A. H. NIELSEN, *Assistant Examiner.*